(12) United States Patent
Noda et al.

(10) Patent No.: US 11,701,900 B2
(45) Date of Patent: Jul. 18, 2023

(54) PRINTER PROVIDED WITH CONDENSER LENS THAT FOCUSES LIGHT EMITTED FOR CURING INK DEPOSITED ON PRINTING OBJECT

(71) Applicant: BROTHER KOGYO KABUSHIKI KAISHA, Nagoya (JP)

(72) Inventors: Masahiro Noda, Ogaki (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/744,188

(22) Filed: May 13, 2022

(65) Prior Publication Data

US 2022/0379632 A1 Dec. 1, 2022

(30) Foreign Application Priority Data

May 27, 2021 (JP) ................................ 2021-089428

(51) Int. Cl.
*B41J 11/00* (2006.01)
*G02B 19/00* (2006.01)

(52) U.S. Cl.
CPC ..... *B41J 11/00214* (2021.01); *G02B 19/0095* (2013.01)

(58) Field of Classification Search
CPC ........... B41J 11/00214; B41J 11/00218; G02B 19/0095
See application file for complete search history.

(56) References Cited

U.S. PATENT DOCUMENTS

2019/0054745 A1\* 2/2019 Taguchi ..................... B01J 4/04

FOREIGN PATENT DOCUMENTS

| JP | 2012-020481 A | 2/2012 |
| JP | 2013-151130 A | 8/2013 |
| JP | 2014-192403 A | 10/2014 |
| WO | 2017/170949 A1 | 10/2017 |

\* cited by examiner

*Primary Examiner* — Bradley W Thies
(74) *Attorney, Agent, or Firm* — Kenealy Vaidya LLP

(57) ABSTRACT

A printer includes: a head; a lamp; a condenser lens; a platen; and a lamp cover. The head is configured to eject a light-curable ink onto a printing object. The lamp is movable relative to the printing object in a main scanning direction, and is configured to emit light to irradiate the printing object. The condenser lens is configured to focus the light emitted from the lamp. The platen is configured to support the printing object and to move in a sub scanning direction relative to the head. The lamp cover has translucency, and includes one end portion and the other end portion in the sub scanning direction. Each of the one end portion and the other end portion has an adjustment part. The adjustment part is configured to adjust the light transmitted through the lamp cover by blocking part of the light or diffusing the light.

10 Claims, 8 Drawing Sheets

PRINTER PROVIDED WITH CONDENSER LENS THAT FOCUSES LIGHT EMITTED FOR CURING INK DEPOSITED ON PRINTING OBJECT

CROSS REFERENCE TO RELATED APPLICATIONS

This application claims priority from Japanese Patent Application No. 2021-089428 filed May 27, 2021. The entire content of the priority application is incorporated herein by reference.

BACKGROUND

Conventionally, there has been known an image-recording device that uses photocurable ink to record images on recording media. The image-recording device is provided with an inkjet-type recording head, and an ultraviolet light (hereinafter abbreviated as "UV light") irradiation unit. The UV light irradiation unit has a light-emitting element and a condenser lens provided inside a housing. Further, a guide member is fitted into an irradiation surface of the housing which is irradiated with UV light focused by the condenser lens. A slit is formed in the guide member to allow the passage of UV light. The guide member is transparent and can be detached and replaced. The guide member suppresses ink mist, generated when the recording head ejects ink, from entering the housing.

SUMMARY

The light intensity in irradiated areas of a printed object is greater when the light is focused by the condenser lens than when the light is not focused. Consequently, the rate of change in light intensity at the boundaries between irradiated areas and non-irradiated areas is also greater when using a condenser lens than when not using a condenser lens. Here, a large rate of change in light intensity at the boundaries between irradiated areas and non-irradiated areas in a sub scanning direction, which is the direction in which the object being printed (hereinafter referred to as "printing object") is conveyed, tends to generate streaks in the image extending in a main scanning direction, which is the direction in which the lamp emitting light moves. Therefore, the use of a condenser lens is problematic in that image quality may degraded.

In view of the foregoing, it is an object of the present disclosure to provide a printer capable of maintaining good image quality, even when using a condenser lens that focuses light for the purpose of curing ink.

In order to attain the above and other objects, according to one aspect, the present disclosure provides a printer that includes: a head; a lamp; a condenser lens; a platen; and a lamp cover. The head is configured to eject a light curable ink onto a printing object. The lamp is movable relative to the printing object in a main scanning direction. The lamp is configured to emit light to irradiate the printing object on which the ink ejected from the head is deposited. The condenser lens is configured to focus the light emitted from the lamp. The platen is configured to support the printing object and to move in a sub scanning direction relative to the head. The sub scanning direction crosses the main scanning direction. The lamp cover has translucency. The lamp cover is configured to transmit the light focused by the condenser lens. The lamp cover includes one end portion and the other end portion in the sub scanning direction. Each of the one end portion and the other end portion has and adjustment part. The adjustment part is configured to adjust the light transmitted through the lamp cover by blocking part of the light or diffusing the light.

According to the configuration described above, the printer can suppress an increase in the rate of change in light intensity at boundaries in the sub scanning direction between irradiated areas on the printing object irradiated with light and non-irradiated areas caused by using the condenser lens. Therefore, the printer can prevent the generation of streaks extending in the main scanning direction, thereby maintaining good quality of images.

In the printer according to the aspect described above, it is preferable that the adjustment part includes: a first adjustment part; and a second adjustment part. The first adjustment part is provided in the one end portion of the lamp cover. The first adjustment part has at least one first light-shielding line extending in the main scanning direction. The at least one first light-shielding line has a light-shielding property. The second adjustment part is provided in the other end portion of the lamp cover. The second adjustment part has at least one second light-shielding line extending the main scanning direction. The at least one second light-shielding line has a light-shielding property.

According to the configuration described above, the light-shielding lines block some of the light transmitted through both end portions of the lamp cover in the sub scanning direction. As a result, the printer can suppress an increase in the rate of change in light intensity at the boundaries in the sub scanning direction between the irradiated areas and the non-irradiated areas. Therefore, the printer can prevent the generation of streaks extending in the main scanning direction.

In the printer according to the aspect described above, it is preferable that the adjustment part includes: a first adjustment part; and a second adjustment part. The first adjustment part is provided in the one end portion of the lamp cover. The first adjustment part has one of a first prism and a first embossing. The one of the first prism and the first embossing is configured to diffuse light passing therethrough. The second adjustment part is provided in the other end portion of the lamp cover. The second adjustment part has one of a second prism and a second embossing. The one of the second prims and the second embossing is configured to diffuse light passing therethrough.

According to the configuration described above, the prism or the embossing diffuses the light transmitted through both end portions of the lamp cover in the sub scanning direction. As a result, the printer can suppress an increase in the rate of change in light intensity at the boundaries between the irradiated areas and the non-irradiated areas. Therefore, the printer can prevent the generation of streaks extending in the main scanning direction.

In the printer according to the aspect described above, it is preferable that the lamp cover includes: a light-transmitting part; a first support part; and a second support part. The light-transmitting part is configured to transmit light. The light-transmitting part has one end portion and the other end portion in the main scanning direction. The first support part supports the one end portion of the light-transmitting part. The second support part supports the other end portion of the light-transmitting part. It is also preferable that one of the first support part and the second support part is formed with an opening.

According to the configuration described above, the lamp cover allows air in the area enclosed by the light-transmitting part, the first support part and the second support part to be discharged via the opening. Hence, by discharging air through the opening, the printer can suppress a rise in temperature inside the lamp cover. Accordingly, the printer can prevent deterioration of the lamp cover caused by rising temperatures.

In the printer according to the aspect described above, it is preferable that the second support part is positioned opposite side of the first support part from the head in the main scanning direction, and the opening is formed in the first support part.

According to the configuration described above, air discharged through the opening blows against the head. Accordingly, the printer can cool the head with air discharged through the opening.

In the printer according to the aspect described above, it is preferable that the second support part is positioned on an opposite side of the first support part from the head in the main scanning direction, and the opening is formed in the second support part.

According to the configuration described above, the printer can suppress air discharged through the opening from affecting ink ejected from the head.

In the printer according to the aspect described above, it is preferable that the opening has a first area in a first cross section orthogonal to the main scanning direction and a second area in a second cross section orthogonal to the main scanning direction. The first cross section is positioned farther from the light-transmitting part than the second cross section is from the light-transmitting part in the main scanning direction. The first area is smaller than the second area.

According to the configuration described above, the printer can increase the velocity of air flowing through the opening, thereby discharging air efficiently via the opening.

In the printer according to the aspect described above, it is preferable that the light-transmitting part is formed of one of a translucent film and polycarbonate.

According to the configuration described above, the light-transmitting part having translucency can easily be created.

Preferably, the printer according to the aspect described above further includes a light source. The light source includes at least the lamp and the condenser lens. It is also preferable that the lamp cover is detachably provided on the light source.

According to the configuration described above, the user of printer can replace a worn lamp cover with a new lamp cover.

In the printer according to the aspect described above, it is preferable that the ink ejected from the head is an ultraviolet-curable ink that is cured when exposed to ultraviolet light. It is also preferable that the light emitted from the lamp is ultraviolet light.

The configuration described above allows the printer to form images by focusing the ultraviolet light emitted from the lamp with the condenser lens, irradiating ink with the focused ultraviolet light, and curing the ink through exposure to ultraviolet light.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, a printer 1 according to one embodiment of the present disclosure will be described while referring to the accompanying drawings. The top, bottom, lower-left, upper-right, lower-right, and upper-left of the printer 1 shown in FIG. 1 will denote the top, bottom, front, rear, right, and left of the printer 1 in the following description.

<Overall Structure of the Printer 1>

Figure 1:
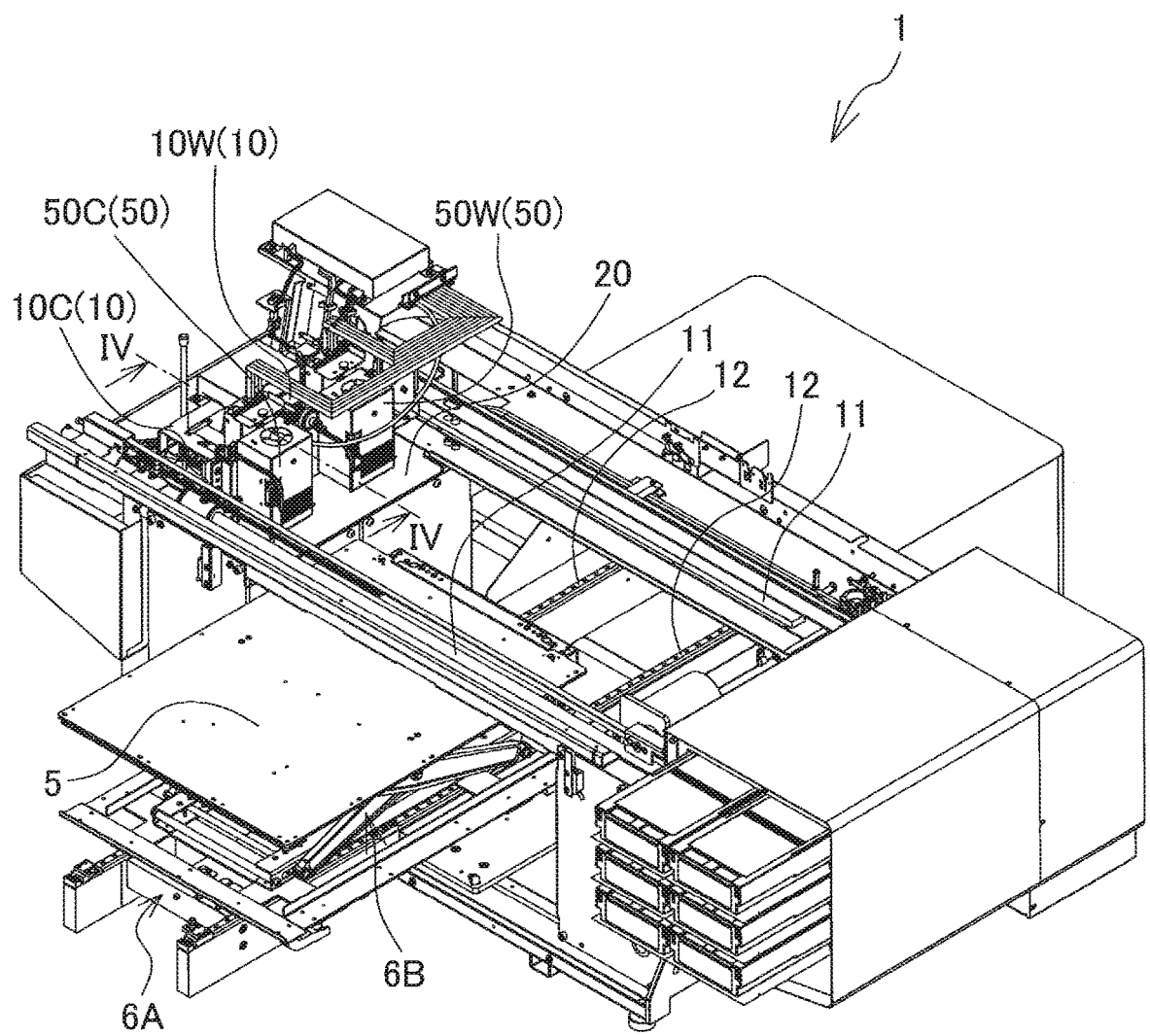
FIG. 1 is a perspective view of a printer.
Figure 1:
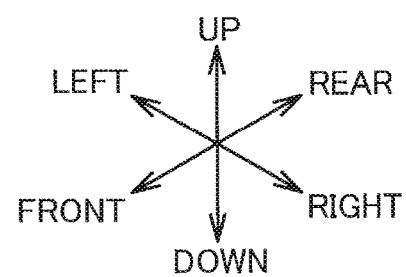

First, the overall structure of the printer 1 will be described with reference to FIGS. 1 through 3. As shown in FIG. 1, the printer 1 is provided with a conveying mechanism 6A, an elevating mechanism 6B, and a platen 5. The conveying mechanism 6A is provided in the bottom of the printer 1. The conveying mechanism 6A includes a pair of rails 12. The rails 12 extend in the front-rear direction and are spaced apart in the left-right direction.

The elevating mechanism 6B is disposed above the conveying mechanism 6A and is supported by the pair of rails 12. The elevating mechanism 6B is driven by a sub scanning motor (not shown) to move in the front-rear direction along the rails 12. The elevating mechanism 6B expands and contracts in the up-down direction (i.e., vertically) when driven by an elevating motor (not shown).

The platen 5 is a plate. The platen 5 is disposed above the elevating mechanism 6B and is supported by the elevating mechanism 6B. The platen 5 moves in the up-down direction (vertically) as the elevating mechanism 6B expands and contracts in the up-down direction (vertically). The platen 5 moves in the front-rear direction along with the front-rear movement of the elevating mechanism 6B.

The printer 1 is provided with a pair of rails 11, and a carriage 20. The rails 11 are disposed above the platen 5. The rails 11 extend in the left-right direction and are spaced apart in the front-rear direction. The carriage 20 is disposed between the rails 11 in the front-rear direction. The carriage 20 is a plate and is supported by the rails 11. The carriage 20 moves in the left-right direction along the rails 11 when driven by a main scanning motor (not shown).

The carriage 20 supports recording heads 10W and 10C and light source units 50W and 50C. Each of the recording heads 10W and 10C and light source units 50W and 50C has a rectangular parallelepiped shape. In the following description, the recording heads 10W and 10C will be referred to as "recording heads 10" and the light source units 50W and 50C will be referred to as "light source units 50" when there is no need to distinguish between them. As the carriage 20 moves, the recording heads 10 and light source units 50 move in the left-right direction relative to a printing object M supported on the platen 5.

Figure 2:
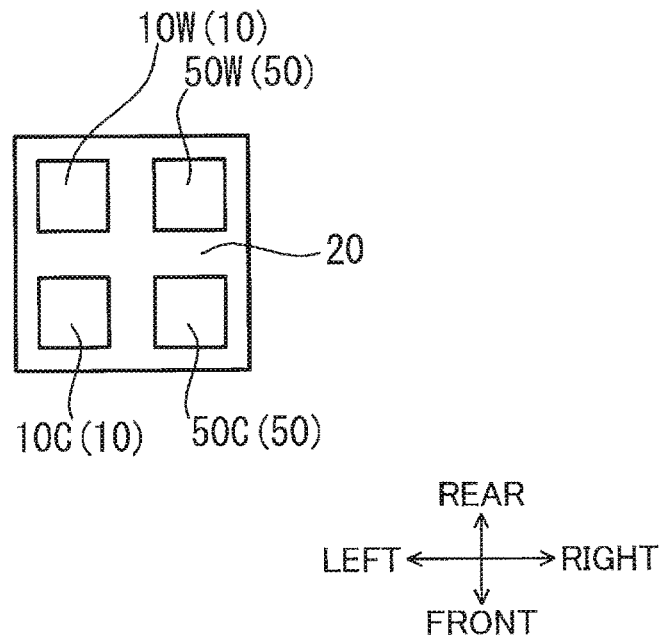
FIG. 2 is a schematic plan view of a carriage on which heads and light source units are supported.

As shown in FIG. 2, the recording heads 10W and 10C are juxtaposed in the front-rear direction. The rear recording head 10W ejects clear ink, while the front recording head 10C ejects color ink. The light source unit 50W is disposed on the right side of the recording head 10W, and the light source unit 50C is disposed on the right side of the recording head 10C. The light source units 50W and 50C are juxtaposed in the front-rear direction.

Figure 3:
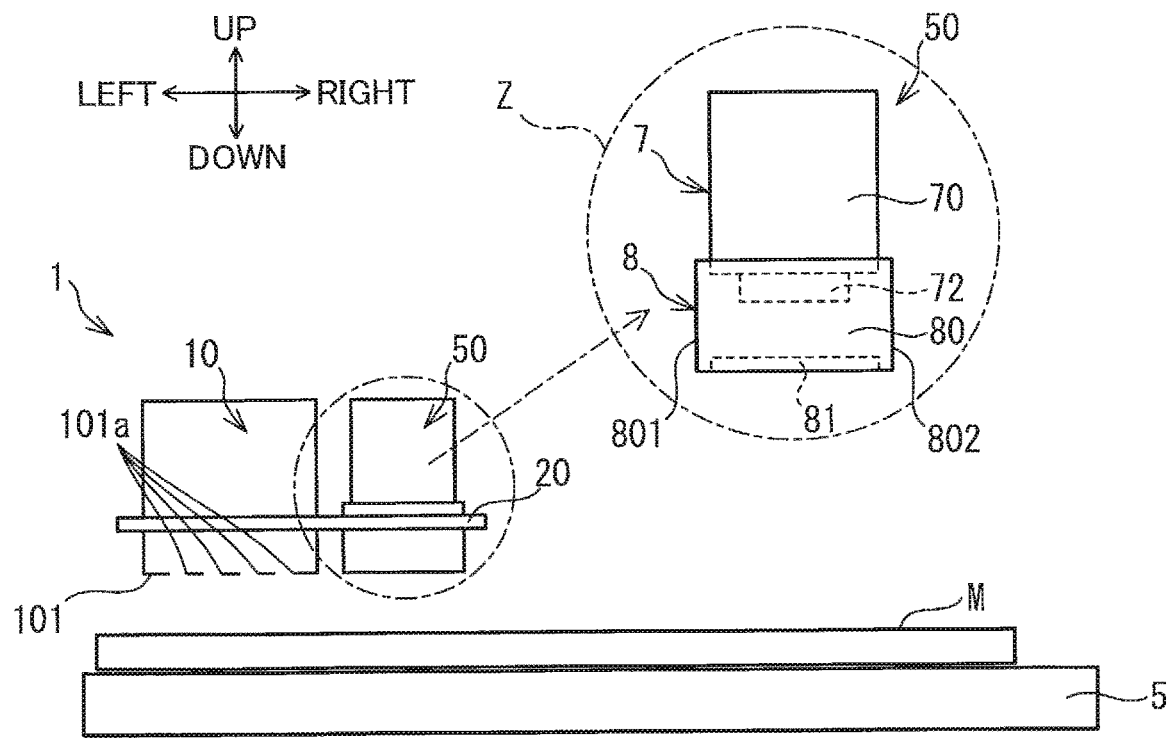
FIG. 3 is a schematic front view of the carriage on which the heads and the light source units are supported, a platen, and a printing object supported on the platen.

As shown in FIG. 3, the bottom surface of each recording head 10 constitutes a nozzle surface 101. The nozzle surface 101 is positioned above the platen 5 and faces the platen 5 from above. A plurality of nozzle holes 101a is formed in the nozzle surface 101. The recording head 10 ejects ink downward from the nozzle holes 101a. As an example, the ink may be ultraviolet-curable ink (hereinafter abbreviated as "UV-curable ink") that is cured when exposed to UV light.

As shown in FIG. 3, the light source units 50 are positioned to the right of the recording heads 10. FIG. 3 also shows an enlarged view of one of the light source units 50 (encircled by a frame Z drawn with a single dotted line) without the carriage 20. Each light source unit 50 is provided with a lamp 7, a condenser lens 72, and a lamp cover 8. The lamp 7 emits UV light downward. The lamp cover 8 is provided on the bottom end of the lamp 7. The light source unit 50 irradiates UV light downward. The printing object M is supported on the top surface of the platen 5. The printing object M is in the form of a plate or sheet, for example, and is composed of fabric, paper, plastic, or metal, for example. The recording heads 10 eject UV-curable ink toward the printing object M supported on the platen 5. The light source units 50 irradiate the printing object M on which ink has been deposited with UV light. In this manner, the printer 1 according to the present embodiment performs printing.

The lamp cover 8 is provided on the bottom end of a housing 70 of the lamp 7 described later. The lamp cover 8 is provided with a support body 80, and a light-transmitting part 81. The support body 80 has support parts 801 and 802. As shown in FIG. 3, the support part 801 is positioned to the right of the recording head 10 and faces the recording head 10 from the right side. The support part 802 is positioned on the opposite side of the support part 801 from the recording head 10 in the left-right direction.

<Lamps 7>

Figure 4:
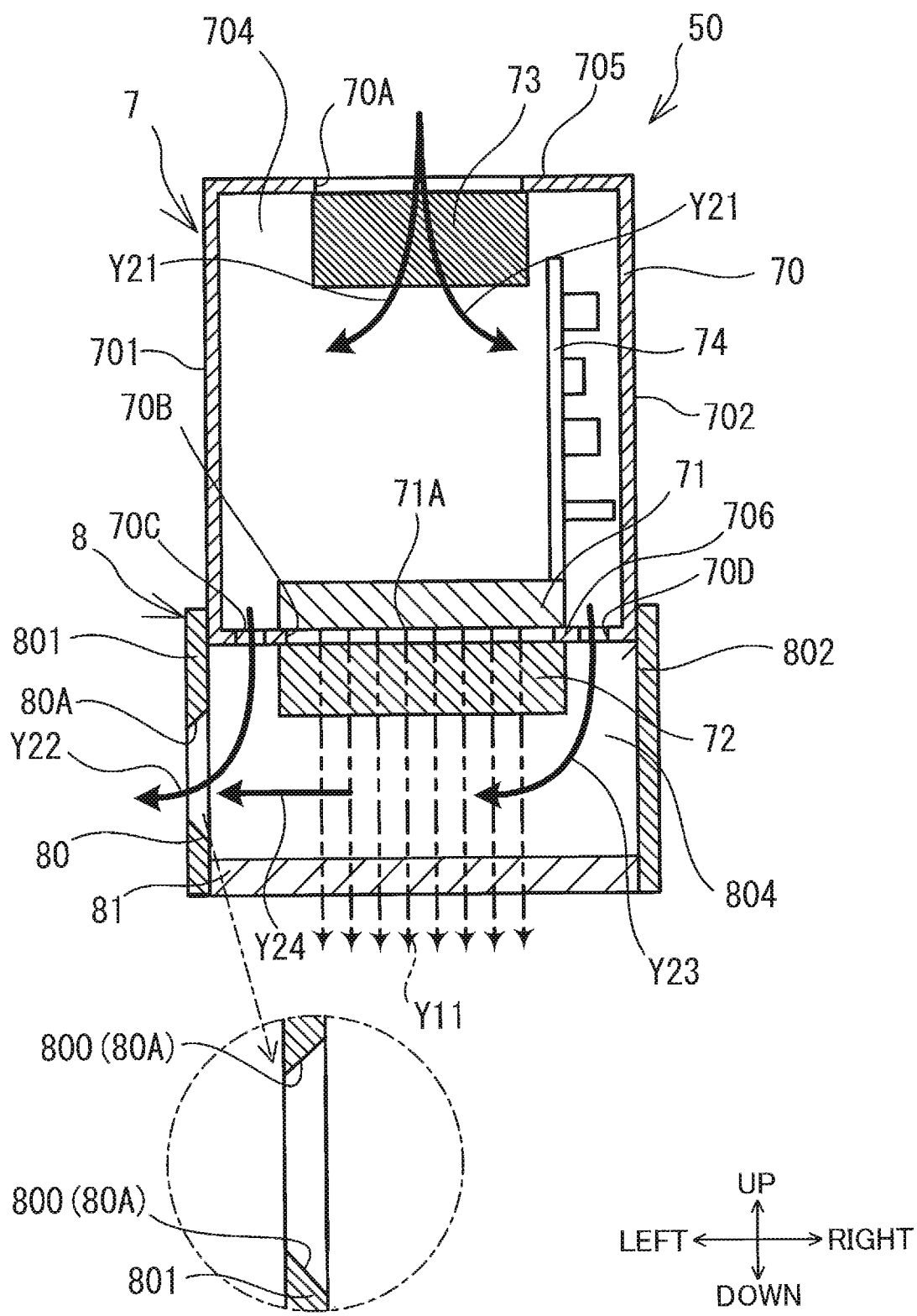
FIG. 4 is a cross-sectional view of the light source unit taken along a line IV-IV illustrated in FIG. 1 and shown from the front side thereof.

As shown in FIG. 4, each lamp 7 is provided with a housing 70, a light source 71, a fan 73, and a control board 74. The housing 70 has a rectangular parallelepiped shape with a top wall 705 and a bottom wall 706. An opening 70A is formed in the top wall 705 of the housing 70. Openings 70B, 70C, and 70D are formed in the bottom wall 706 of the housing 70.

The fan 73 is disposed inside the housing 70 beneath the opening 70A. The fan 73 can draw air from outside the housing 70 into the housing 70 via the opening 70A, as indicated by arrows Y21. The air drawn into the housing 70 by the fan 73 cools the light source 71 and is subsequently discharged from the housing 70 via the openings 70C and 70D, as indicated by arrows Y22 and Y23. The control board 74 includes a CPU that controls driving of the light source 71 and fan 73.

<Lamp Cover 8>

The lamp cover 8 is disposed on the bottom end of the housing 70 of the lamp 7. The lamp cover 8 is provided with the support body 80 and light-transmitting part 81. The support body 80 has a cylindrical shape. A hole penetrates the support body 80 in the up-down direction (vertically). In a cross section taken orthogonal to the up-down direction, the support body 80 has a rectangular shape that is elongated in the front-rear direction. The light-transmitting part 81 is supported in the support body 80. The light-transmitting part 81 is a rectangular plate.

Figure 5:
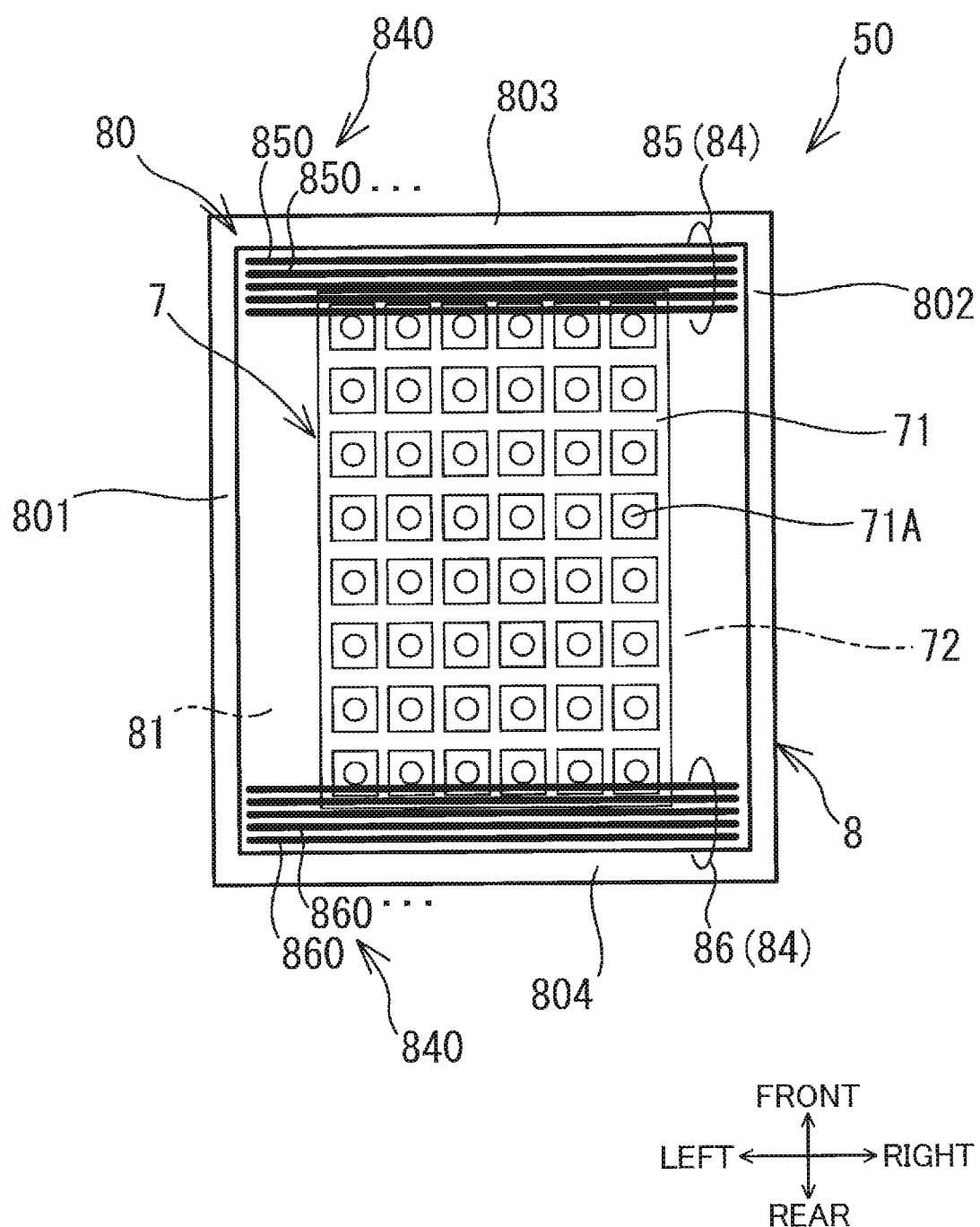
FIG. 5 is a bottom view of the light source unit.
Figure 6:
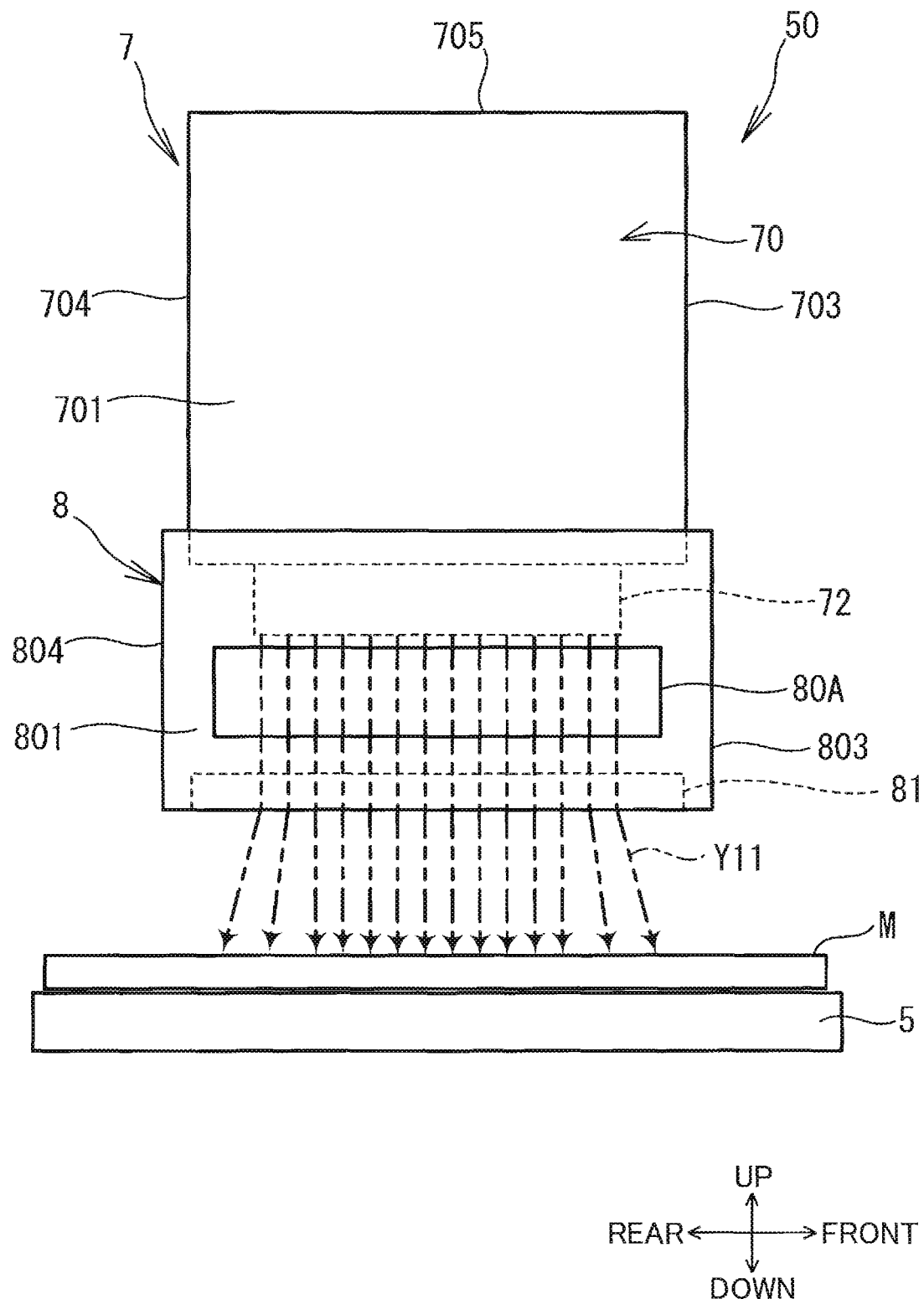
FIG. 6 is a left side view of the light source unit, the platen, and the printing object.

The support body 80 has support parts 801, 802, 803, and 804 (see FIGS. 4, 5, and 6). As shown in FIGS. 4 and 6, the support part 801 extends downward from the bottom end of a left wall 701 of the housing 70. The support part 804 extends downward from the bottom end of a rear wall 704 of the housing 70. The support part 802 extends downward from the bottom end of a right wall 702 of the housing 70. The support part 803 extends downward from the bottom end of a front wall 703 of the housing 70. The top ends of each of the support parts 801 through 804 can be attached to and detached from the housing 70.

As shown in FIG. 4, the support part 801 has an opening 80A. The opening 80A has a rectangular shape that is elongated in the front-rear direction. Air discharged from the housing 70 by the fan 73 is exhausted to the left side of the lamp cover 8 via the opening 80A, as indicated by arrows Y22 and Y24. Inner surfaces 800 of the opening 80A are sloped relative to the left-right direction. Consequently, the area of the opening 80A in a cross section orthogonal to the left-right direction grows smaller toward the side of the support part 801 opposite the light-transmitting part 81 in the left-right direction.

As shown in FIG. 4, the light source 71 is disposed inside the housing 70 above the bottom wall 706. The light source 71 has a plurality of light-emitting diodes 71A capable of emitting UV light. The light-emitting diodes 71A emit UV light downward. The UV light passes through the opening 70B formed in the bottom wall 706, as indicated by arrows Y11. The condenser lens 72 is disposed beneath the bottom wall 706. The condenser lens 72 is not limited to a specific type, but a spherical lens is used as the condenser lens 72 in the present embodiment. The optical axis of the condenser lens 72 is aligned in the up-down direction (the vertical direction). UV light emitted from the light source 71 is focused by the condenser lens 72 after passing through the opening 70B.

As shown in FIG. 5, the left edge, right edge, front edge, and rear edge of the light-transmitting part 81 are connected to the respective bottom edges of the support parts 801, 802, 803, and 804 in the support body 80. The light-transmitting part 81 is formed of a translucent film or polycarbonate. The light-transmitting part 81 is translucent and can transmit UV light.

The light-transmitting part 81 has a first adjustment part 85 on the front end, and a second adjustment part 86 on the rear end. The first adjustment part 85 has a plurality of lines extending linearly in the left-right direction. Hereinafter, these lines will be called the "first light-shielding lines 850." The first light-shielding lines 850 are arranged at equal distances in the front-rear direction. The second adjustment part 86 has a plurality of lines extending linearly in the left-right direction. Hereinafter, these lines will be called the "second light-shielding lines 860." The second light-shielding lines 860 are arranged at equal distances in the front-rear direction. Hereinafter, the first adjustment part 85 and second adjustment part 86 will be collectively referred to as the "adjustment parts 84" when not distinguishing between the two. Further, the first light-shielding lines 850 and second light-shielding lines 860 will be collectively referred to as the "light-shielding lines 840" when not distinguishing between the two. The light-shielding lines 840 are formed by printing the bottom surface of the light-transmitting part 81 with a light-shielding paint.

As indicated by the arrows Y11 in FIG. 6, UV light emitted from the light source 71 of the lamp 7 and focused by the condenser lens 72 passes downward through the light-transmitting part 81. The light-shielding lines 840 shown in FIG. 5 block some of the UV light passing through the light-transmitting part 81, and the UV light that passes through gaps between the light-shielding lines 840 is further diffused by diffraction, as illustrated by the arrows Y11 in FIG. 6.

Figure 7:
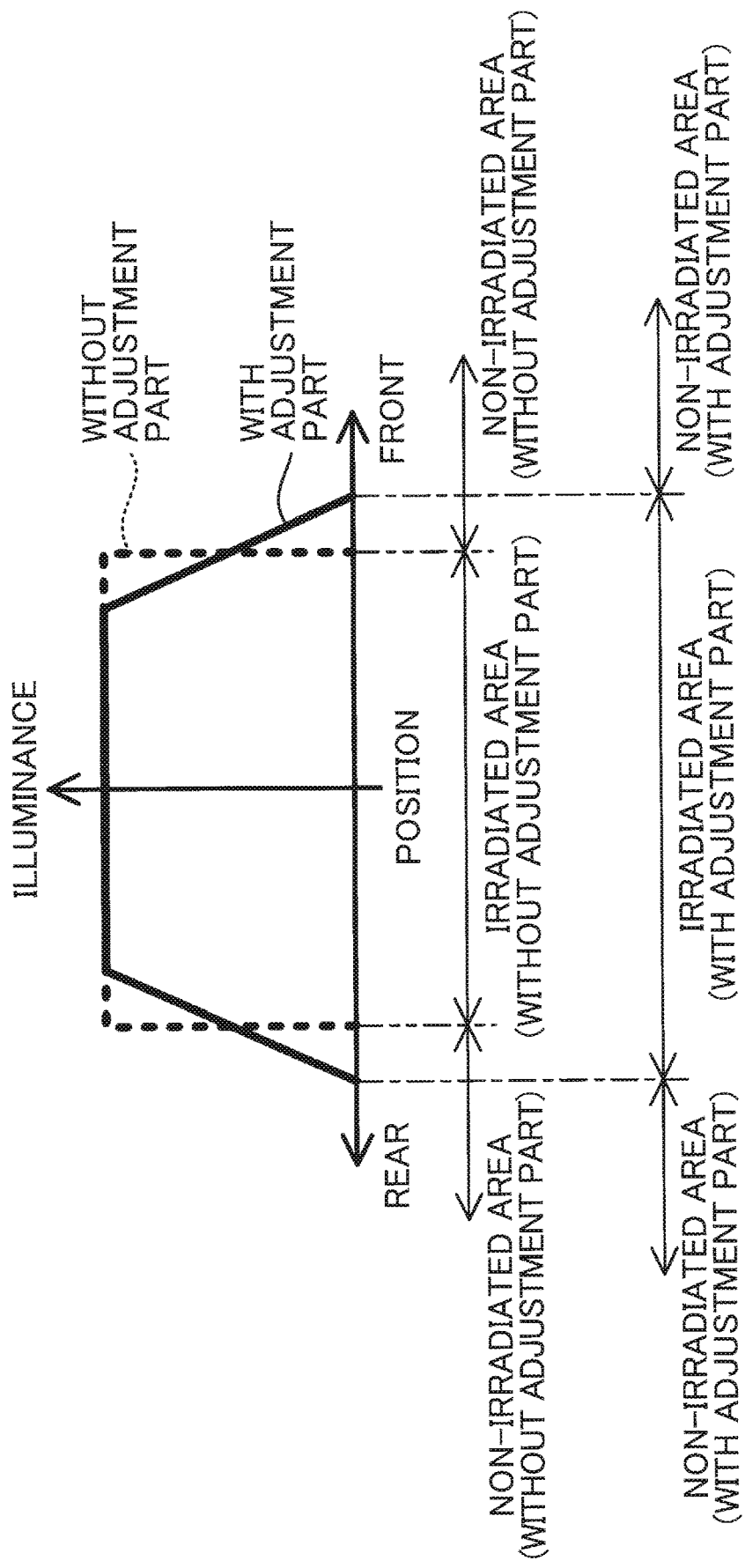
FIG. 7 is a graph showing the illuminance of UV light irradiated onto the printing object when the light source unit is provided with adjustment parts and when the light source unit is not provided with adjustment parts.

The horizontal axis in the graph of FIG. 7 represents the front-rear position on the printing object M supported on the platen 5, while the vertical axis represents the illuminance of UV light irradiated onto the printing object M. As shown in FIG. 7, the area of the printing object M irradiated with UV light (irradiated area) is wider in the front-rear direction when the adjustment parts 84 are provided than when the adjustment parts 84 are not provided. Additionally, on both front and rear ends of this irradiated area, the illuminance grows weaker toward the outsides in the front and rear directions. Therefore, the rate of change in illuminance at the boundaries between the irradiated area and the non-irradiated areas in which UV light is not irradiated is smaller when the adjustment parts 84 are not provided.

<Overview of Printing Operations on the Printer 1>

Next, an example of a printing operation for printing an image W using clear ink will be described with reference to FIGS. 8A through 8C. In the following description, the left-right direction will be called the "main scanning direction." The left side in the following description will be called "one side in the main scanning direction," while the right side will be called "another side in the main scanning direction." Further, the front-rear direction will be called the "sub scanning direction." The forward side will be called "one side in the sub scanning direction," while the rearward direction will be called "another side in the sub scanning direction."

Furthermore, in the following description, the left direction will be called "one direction of the main scanning direction." The right direction will be called "another direction of the main scanning direction." The forward direction will be called "one direction of the sub scanning direction." The rear direction will be called "another direction of the sub scanning direction."

Figure 8A:
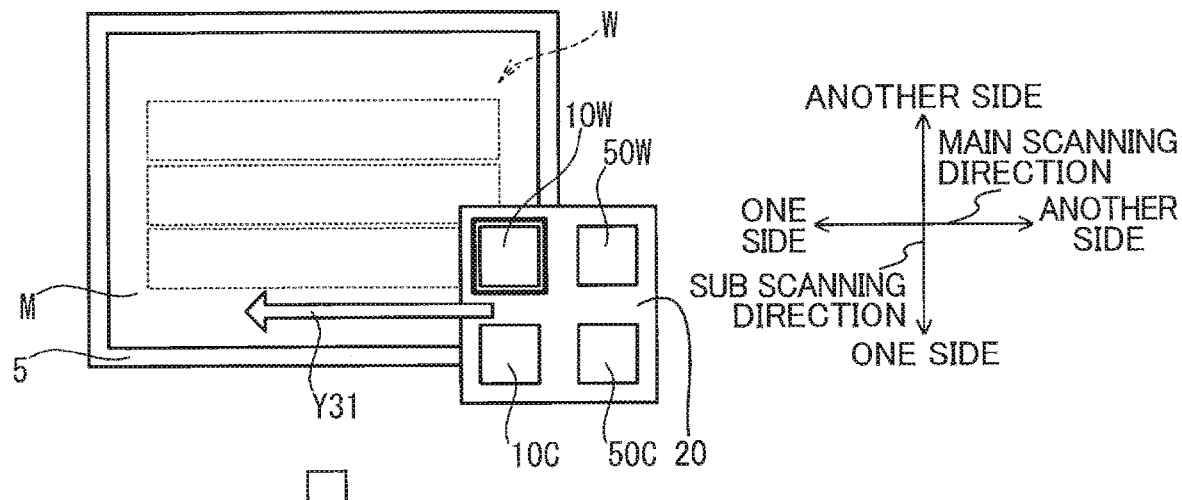
FIGS. 8A, 8B and 8C are explanatory diagram showing a printing operation of the printer.
Figure 8B:
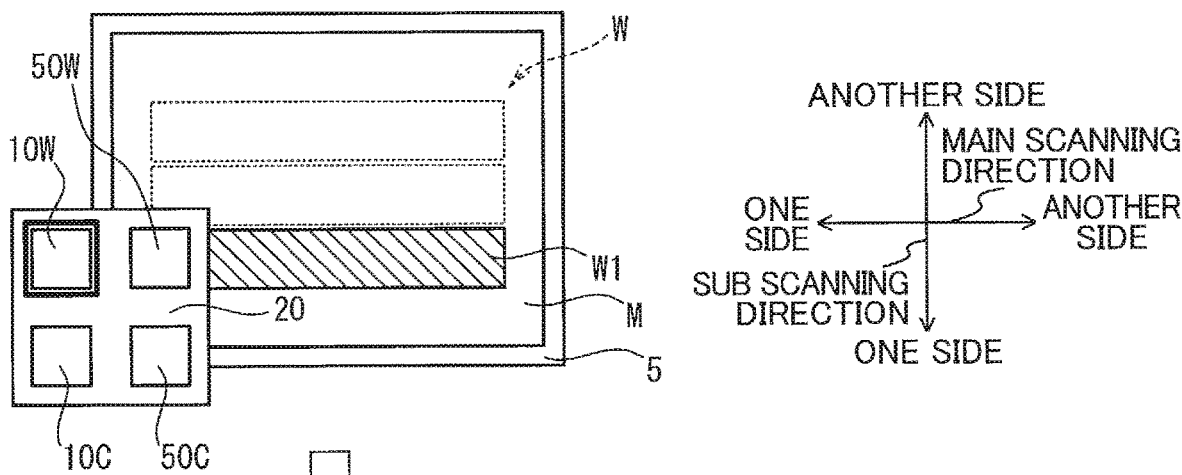
Figure 8C:
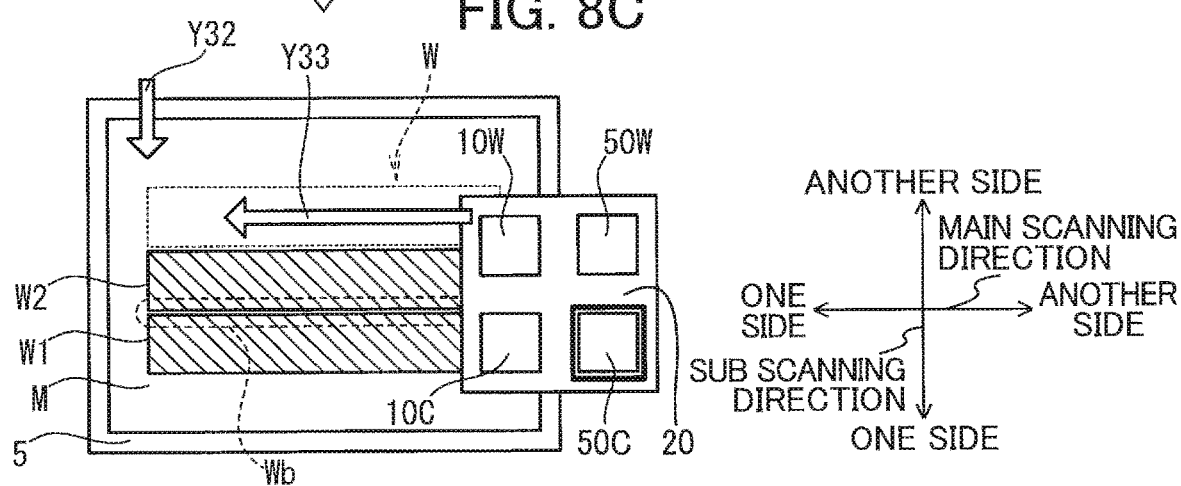

As shown in FIG. 8A, the printer 1 moves the carriage 20 toward the one side in the main scanning direction (arrow Y31) while ejecting clear ink from the recording head 10W. In other words, the printer 1 moves the carriage 20 in one direction of the main scanning direction (arrow Y31) while ejecting clear ink from the recording head 10W. Through this process, the printer 1 forms a line image W1 in clear ink on the printing object M. As shown in FIG. 8B, the line image W1 is an image extending in the main scanning direction. Next, the printer 1 moves the platen 5 toward the one side in the sub scanning direction a distance equivalent to the width of the line image W1 in the sub scanning direction. In other words, the printer 1 moves the platen 5 in one direction of the sub scanning direction a distance equivalent to the width of the line image W1 in the sub scanning direction. Thereafter, the printer 1 moves the carriage 20 toward the other side in the main scanning direction while ejecting clear ink from the recording head 10W. In other words, the printer 1 moves the carriage 20 in the other direction of the main scanning direction while ejecting clear ink from the recording head 10W. Through this operation, the printer 1 forms a line image W2 in clear ink on the printing object M. As shown in FIG. 8C, the line image W2 is an image extending in the main scanning direction. The line image W2 is adjacent to the line image W1 on the other side in the main scanning direction. In other words, the line image W2 is adjacent to the line image W1 on the side downstream in the other direction of the main scanning direction.

Next, the printer 1 moves the platen 5 toward the one side in the sub scanning direction (in the one direction of the sub scanning direction, arrow Y32) until the positions of the light source unit 50C and line image W1 in the sub scanning direction are aligned. Subsequently, the printer 1 moves the carriage 20 toward the one side in the main scanning direction (in the one direction of the main scanning direction, arrow Y33) while emitting UV light from the lamp 7 of the light source unit 50C. As a result, UV light irradiated onto the line image W1 cures the clear ink forming the line image W1. Thereafter, the carriage 20 repeatedly alternates between ejecting clear ink to form the image W and curing the clear ink with UV light.

<Operations and Effects of the Embodiment>

By using the condenser lens 72 to focus UV light emitted from the light source 71, the printer 1 increases the rate of change in illuminance at the boundaries between irradiated areas on the printing object M irradiated with UV light and non-irradiated areas. In this case, a streak extending in the main scanning direction may be generated at a boundary Wb between the line images W1 and W2, for example, degrading the quality of the image W. However, the adjustment parts 84 provided in the printer 1 can suppress an increase in the rate of change in illuminance at boundaries between irradiated areas of UV light and non-irradiated areas. Therefore, the printer 1 can maintain good quality of the image W by preventing the generation of streaks extending in the main scanning direction.

The light-shielding lines 840 block some of the UV light transmitted through both end portions of the light-transmitting part 81 in the sub scanning direction, and the UV light that passes between the light-shielding lines 840 is diffused by diffraction. As a result, the printer 1 can suppress an increase in the rate of change in illuminance at boundaries between irradiated areas irradiated with UV light and non-irradiated areas. Therefore, the printer 1 can prevent the generation of streaks extending in the main scanning direction.

The lamp cover 8 allows air in the area enclosed by the light-transmitting part 81 and support body 80 to be discharged via the opening 80A. Hence, by discharging air through opening 80A, the printer 1 can suppress a rise in temperature inside the lamp cover 8 due to heat generated by the light source 71. Accordingly, the printer 1 can prevent deterioration of the lamp cover 8 caused by rising temperatures.

The opening 80A is formed in the support part 801, which is the support part that opposes the recording head 10 from the right side, rather than the support part 802. In this case, air discharged through the opening 80A blows against the recording head 10. Accordingly, the printer 1 can cool the recording head 10 with air discharged through the opening 80A.

The inner surfaces 800 in the opening 80A slope relative to the left-right direction. Hence, the cross-sectional area in the opening 80A through which discharged air passes grows smaller toward the downstream side in the direction that air passes through the opening 80A. With this configuration, the printer 1 can increase the velocity of air flowing through the opening 80A, thereby discharging air efficiently via the opening 80A.

A light-transmitting part 81 having translucency can easily be created for the printer 1 using a translucent film or polycarbonate.

The lamp cover 8 is detachably provided on the housing 70 of the lamp 7. In this case, the user of the printer 1 can replace a worn lamp cover 8 with a new lamp cover 8.

The printer 1 irradiates UV-curable ink with UV light emitted from the light source 71 after the UV light is focused by the condenser lens 72. This allows the printer 1 to form images by curing ink through exposure to UV light.

<Variations of the Embodiment>

While the description has been made in detail with reference to specific embodiments thereof, it would be apparent to those skilled in the art that many modifications and variations may be made thereto without departing from the spirit of the disclosure, the scope of which is defined by the attached claims.

The recording head 10 and light source unit 50 may be configured to be independently movable in the main scanning direction. The recording head 10 may also be a line head that is elongated in the main scanning direction. In this case, the recording head 10 need not move in the main scanning direction. The condenser lens 72 is not limited to a spherical lens but may be another type of lens, such as an aspheric lens or a rod lens. Alternatively, the condenser lens 72 may be a lens array that includes a plurality of spherical lenses.

The spacing between light-shielding lines 840 may also be configured to narrow toward the outer sides in the front and rear directions. In this case, UV light passing through gaps between the light-shielding lines 840 is not diffused by diffraction but travels directly downward toward the printing object M from the light-transmitting part 81. Alternatively, the adjustment parts 84 may possess only one light-shielding line 840. Both of these configurations can still weaken illuminance toward the outer sides in the front and rear directions at both front and rear ends of the irradiated area irradiated with UV light, thereby suppressing the generation of streaks extending in the main scanning direction.

Figure 9:
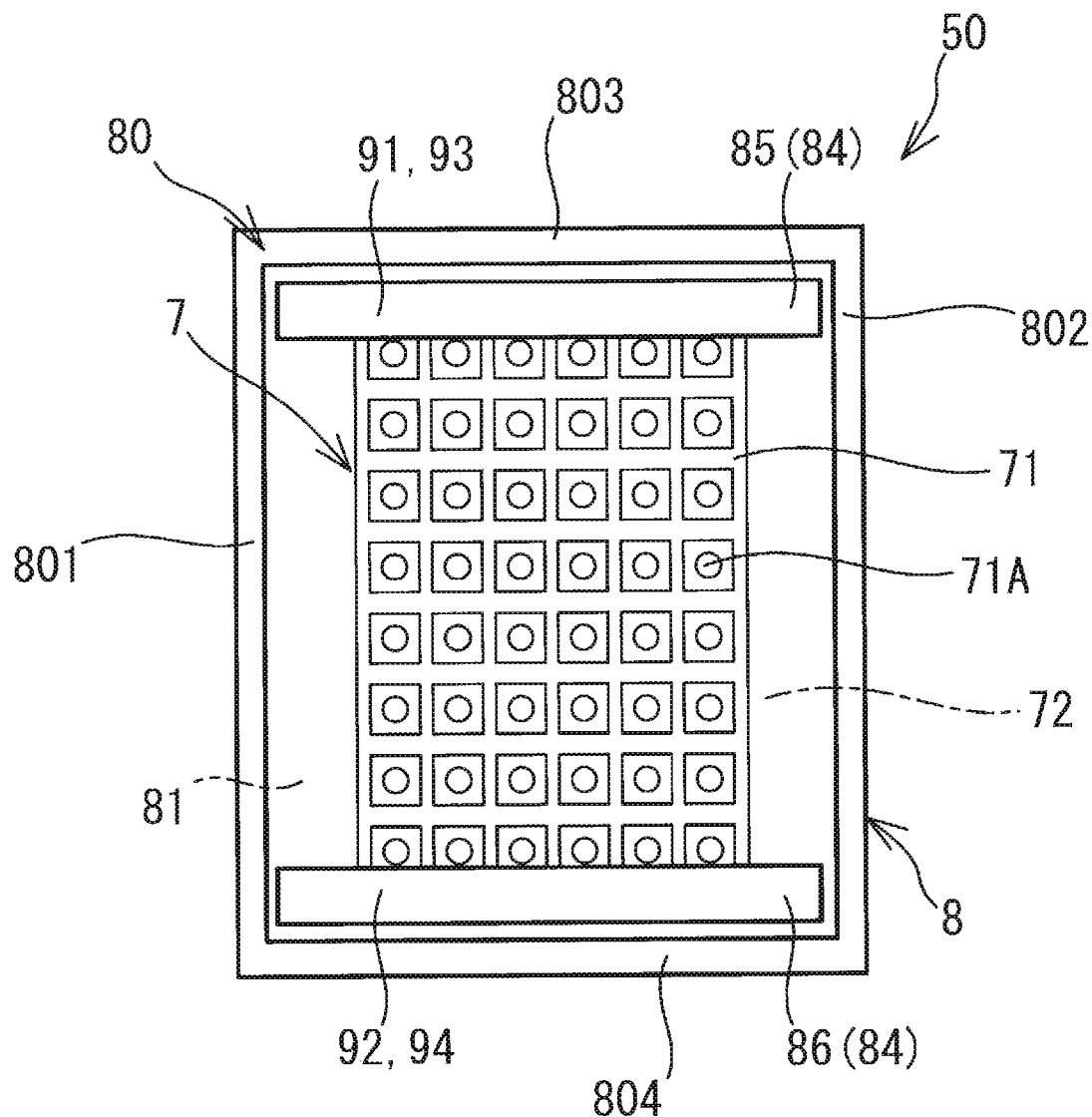
FIG. 9 is a bottom view of another example of a light source unit.
Figure 9:
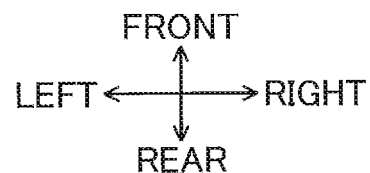

As shown in FIG. 9, the light-transmitting part 81 of the lamp cover 8 may have a first prism 91 as the first adjustment part 85, and a second prism 92 as the second adjustment part 86. The first prism 91 and second prism 92 diffuse UV light by dispersing UV light passing therethrough. Alternatively, the light-transmitting part 81 of the lamp cover 8 may have a first embossing 93 as the first adjustment part 85, and a second embossing 94 as the second adjustment part 86. The first embossing 93 and second embossing 94 have a crease pattern formed in the surface of the light-transmitting part 81. The first embossing 93 and second embossing 94 diffuse UV light by randomly altering the direction at which the UV light passes therethrough. This configuration can suppress an increase in the rate of change in illuminance at boundaries between irradiated areas and non-irradiated areas of UV light, thereby preventing the generation of streaks extending in the main scanning direction.

In the above configurations, the printer 1 may instead have the first prism 91 as the first adjustment part 85 and the second embossing 94 as the second adjustment part 86 or may have the first embossing 93 as the first adjustment part 85 and the second prism 92 as the second adjustment part 86. Further, the adjustment parts 84 of the printer 1 may be configured of structures other than light-shielding lines, prisms, and embossing. For example, the adjustment parts 84 may be formed by coating the light-transmitting part 81 with a chemical agent that absorbs UV light. In this case, the density of the applied chemical agent may be adjusted to become thinner toward the outsides in the front and rear directions.

The opening 80A may be formed in the support part 802 rather than the support part 801. Since the support part 802 is positioned on the opposite side of the support part 801 from the recording head 10 in the main scanning direction, the printer 1 can suppress air discharged through the opening 80A from affecting ink ejected from the recording head 10.

The inner surfaces 800 formed in the opening 80A may be smooth or stepped. As an alternative, a plurality of openings may be formed in the support body 80. For example, openings 80A may be provided in both of the support parts 801 and 802, and an opening 80A may also be formed in the support part 803 that extends downward from the bottom end of the front wall 703 configuring the housing 70 and in the support part 804 that extends downward from the bottom end of the rear wall 704 configuring the housing 70. A fan may also be provided in the opening 80A in place of the fan 73 provided in the housing 70.

The light-transmitting part 81 is not limited to a transparent film or polycarbonate but may be formed of other materials having translucent properties. The light-transmitting part 81 may also be formed integrally with the support body 80. The lamp 7 and lamp cover 8 may also be formed as an integral unit. The light emitted from the light source 71 is not limited to UV light but may be light of another wavelength capable of curing ink.

The support part 801 is an example of the first support part of the present disclosure. The support part 802 is an example of the second support part of the present disclosure.

What is claimed is:

1. A printer comprising:
   a head configured to eject a light-curable ink onto a printing object;
   a lamp movable relative to the printing object in a main scanning direction, the lamp being configured to emit light to irradiate the printing object on which the ink ejected from the head is deposited;
   a condenser lens configured to focus the light emitted from the lamp;
   a platen configured to support the printing object and to move in a sub scanning direction relative to the head, the sub scanning direction crossing the main scanning direction; and
   a lamp cover having translucency and configured to transmit the light focused by the condenser lens, the lamp cover including one end portion and the other end portion in the sub scanning direction, each of the one end portion and the other end portion having an adjustment part configured to adjust the light transmitted through the lamp cover by blocking part of the light or diffusing the light.

2. The printer according to claim 1,
   wherein the adjustment part comprises:
   a first adjustment part provided in the one end portion of the lamp cover, the first adjustment part having at least one first light-shielding line extending in the main scanning direction, the at least one first light-shielding line having a light-shielding property; and
   a second adjustment part provided in the other end portion of the lamp cover, the second adjustment part having at least one second light-shielding line extending in the main scanning direction, the at least one second light-shielding line having a light-shielding property.

3. The printer according to claim 1,
wherein the adjustment part comprises:
   a first adjustment part provided in the one end portion of the lamp cover, the first adjustment part having one of a first prism and a first embossing configured to diffuse light passing therethrough; and
   a second adjustment part provided in the other end portion of the lamp cover, the second adjustment part having one of a second prism and a second embossing configured to diffuse light passing therethrough.

4. The printer according to claim 1,
wherein the lamp cover comprises:
   a light-transmitting part configured to transmit light, the light-transmitting part having one end portion and the other end portion in the main scanning direction;
   a first support part supporting the one end portion of the light-transmitting part; and
   a second support part supporting the other end portion of the light-transmitting part, and
wherein one of the first support part and the second support part is formed with an opening.

5. The printer according to claim 4,
wherein the second support part is positioned on an opposite side of the first support part from the head in the main scanning direction, and the opening is formed in the first support part.

6. The printer according to claim 4,
wherein the second support part is positioned on an opposite side of the first support part from the head in the main scanning direction, and the opening is formed in the second support part.

7. The printer according to claim 4,
wherein the opening has a first area in a first cross section orthogonal to the main scanning direction and a second area in a second cross section orthogonal to the main scanning direction, the first cross section being positioned farther from the light-transmitting part than the second cross section is from the light-transmitting part in the main scanning direction, the first area being smaller than the second area.

8. The printer according to claim 4,
wherein the light-transmitting part is formed of one of a translucent film and polycarbonate.

9. The printer according to claim 1, further comprising:
a light source including at least the lamp and the condenser lens,
wherein the lamp cover is detachably provided on the light source.

10. The printer according to claim 1,
wherein the ink ejected from the head is an ultraviolet-curable ink that is cured when exposed to ultraviolet light, and
wherein the light emitted from the lamp is ultraviolet light.

* * * * *